United States Patent
Meuter

(10) Patent No.: US 7,338,252 B2
(45) Date of Patent: Mar. 4, 2008

(54) PUMP FOR THE TRANSPORTING OF FLUIDS AND OF MIXTURES OF FLUIDS

(75) Inventor: Paul Meuter, Seuzach (CH)

(73) Assignee: Sulzer Pumpen AG, Winterthur (CH)

(*) Notice: Subject to any disclaimer, the term of this patent is extended or adjusted under 35 U.S.C. 154(b) by 0 days.

(21) Appl. No.: 10/493,180

(22) PCT Filed: Oct. 22, 2002

(86) PCT No.: PCT/CH02/00575

§ 371 (c)(1),
(2), (4) Date: Apr. 19, 2004

(87) PCT Pub. No.: WO03/036097

PCT Pub. Date: May 1, 2003

(65) Prior Publication Data

US 2004/0253120 A1 Dec. 16, 2004

(30) Foreign Application Priority Data

Oct. 22, 2001 (EP) .................... 01811028

(51) Int. Cl.
F04D 29/12 (2006.01)
(52) U.S. Cl. .............. 415/107; 415/113; 415/230
(58) Field of Classification Search ............ 415/173.3, 415/173.4, 173.5, 174.2, 174.4, 174.5, 230–231, 415/180, 111–113, 104, 107; 277/355, 571
See application file for complete search history.

(56) References Cited

U.S. PATENT DOCUMENTS

| 885,032 | A | * | 4/1908 | Ferranti | 277/355 |
|---|---|---|---|---|---|
| 2,332,150 | A | * | 10/1943 | Huff | 415/112 |
| 4,177,008 | A | * | 12/1979 | Florjancic et al. | 415/206 |
| 4,468,176 | A | * | 8/1984 | Munch | 415/104 |
| 4,844,255 | A | | 7/1989 | Schmitt | |
| 4,971,336 | A | * | 11/1990 | Ferguson | 277/355 |
| 5,088,891 | A | * | 2/1992 | Brown et al. | 415/176 |
| 5,558,491 | A | * | 9/1996 | Andrews | 415/111 |
| 5,713,720 | A | * | 2/1998 | Barhoum | 415/104 |
| 5,799,952 | A | * | 9/1998 | Morrison et al. | 277/355 |
| 5,997,004 | A | | 12/1999 | Braun et al. | |
| 6,290,456 | B1 | * | 9/2001 | Fichter et al. | 415/173.3 |
| 6,308,957 | B1 | * | 10/2001 | Wright | 277/355 |
| 6,416,057 | B1 | * | 7/2002 | Adams et al. | 277/355 |
| 6,533,284 | B2 | * | 3/2003 | Aksit et al. | 277/355 |

(Continued)

FOREIGN PATENT DOCUMENTS

DE    9001229 U1    5/1990

(Continued)

Primary Examiner—Richard A. Edgar
(74) Attorney, Agent, or Firm—Townsend and Townsend and Crew LLP

(57) ABSTRACT

A pump for the transporting of fluids and/or of mixtures of fluids includes a housing (1) and at least one restrictor gap seal which is provided in the housing (1) to reduce the pressure in a restrictor gap along a rotatable part (2) of the pump, wherein the restrictor gap seal is formed as a brush seal arrangement (8). The brush seal arrangement (8) contains one or more individual brush seals (8') which include as sealing members a plurality of sealingly arranged fibers, bristles and/or wires (8a) which are distributed and fastened in ring form and whose free ends extend towards the surface to be sealed.

10 Claims, 3 Drawing Sheets

U.S. PATENT DOCUMENTS 6,568,901 B2 * 5/2003 Wang et al. ................. 415/104
6,609,882 B2 * 8/2003 Urlichs ....................... 415/104

FOREIGN PATENT DOCUMENTS

| DE | 3936429 | A1 | 5/1991 |
| DE | 19519322 | A1 | 11/1996 |
| EP | 0500486 | A1 | 8/1992 |
| EP | 1070887 | A2 | 1/2001 |

* cited by examiner

PUMP FOR THE TRANSPORTING OF FLUIDS AND OF MIXTURES OF FLUIDS

BACKGROUND OF THE INVENTION

The invention relates to a pump for the transporting of fluids and/or of mixtures of fluids with a proportion of solid material, comprising a housing and at least one restrictor gap seal which is provided in the housing to reduce the pressure in a restrictor gap along a rotatable part of the pump.

Centrifugal pumps are also used for the transporting of fluids and of mixtures of fluids with a proportion of solid material such as multiphase mixtures of oil, gas, water and sand, such as occur in the transporting of crude oil and natural gas. Such a pump includes a pump shaft fitted with impellers, which are rotatably arranged in a housing, as well as a relief piston for the axial thrust compensation which is connected to the pump shaft such that it rotates along on the rotation of the pump shaft. So that the pump shaft and the relief piston are freely rotatable in the housing and, on the other hand, pressure compensation flows along the rotatable parts are limited, restrictor gaps are formed between the housing and the pump shaft or the relief piston respectively. Furthermore, restrictor gap seals are provided in the pump to reduce the pressure in the restrictor gaps along the pump shaft or along the relief piston respectively and to reduce the gap losses associated with the pressure compensation flows in this manner.

The embodiments of restrictor gap seals used in conventional pump construction include, for example, smooth restrictor gaps with a small gap width, restrictor gaps with labyrinths, restrictor gaps with radial sealing rings, with quench seals, floating-ring seals, different embodiments of face seals or packs. The restrictor gap seals of the prior art all have their specific disadvantages; e.g. the leakage amount of the smooth restrictor gap is relatively large, the clearance between the housing and the rotatable parts is critical and the comparatively long construction of the smooth restrictor part is irritating. It is disadvantageous in the face seals that they are of complex design and react sensitively to changes in temperature and rotational speed. In pumps with multiphase mixtures, in particular multiphase mixtures with a proportion of solid material, there is a further difficulty in that the abrasive effect of the solids has a noticeable effect on the service frequency and service life of the restrictor gap seals.

SUMMARY OF THE INVENTION

It is an underlying object of the present invention to make available a pump for the transporting of fluids and/or mixtures of fluids with a proportion of solid material which avoids the disadvantages of the prior art and which is fitted with restrictor gap seals, in particular restrictor gap seals with relatively simple, robust and compact designs, which can be designed for small leakage amounts and are less sensitive with respect to production tolerances and to changes in temperature and rotational speed and which have a comparatively low service effort.

This object is satisfied in accordance with the invention by the pump described below.

The pump in accordance with the invention for the transporting of fluids and/or of mixtures of fluids with a proportion of solid material includes a housing and at least one restrictor gap seal which is provided in the housing to reduce the pressure in a restrictor gap along a rotatable part of the pump, with the restrictor gap seal being formed as a brush seal arrangement. The brush seal arrangement contains one or more individual brush seals which include as seal members a plurality of sealingly arranged fibers, bristles and/or wires which are distributed and fastened in ring form and whose free ends extend towards the surface to be sealed, in particular towards the surface of the rotatable part.

The restrictor gap seal is preferably rigidly arranged in the housing of the pump.

In a preferred embodiment, the restrictor gap seal is arranged in the region of a rotatable relief piston for the axial thrust compensation in order to reduce the pressure in a restrictor gap along the relief piston. In a further preferred embodiment, the restrictor gap seal is formed as a dynamic shaft seal to seal a rotatable shaft with respect to the housing.

The fibers, bristles and/or wires of the brush seal are preferably flexible and/or are fastened flexibly and are expediently arranged at an acute angle to the surface of the rotatable part, with the tip of the angle extending in the running direction of the rotatable part. The length of the fibers, bristles and/or wires of the brush seal is preferably predetermined such that they can be ground to a suitable length by the rotatable part, for example by a shaft, by a shaft protection sleeve or by a relief piston.

The shaft is preferably provided with a shaft protection sleeve in the region of the restrictor gap seal.

In a further preferred embodiment, the brush seal arrangement includes a section through which a blocking fluid and/or a flushing fluid flows and which, as required, has a lower temperature than the transported fluids and/or mixtures of fluids with a proportion of solid material in order to achieve a cooling effect. A plurality of brush seals of the brush seal arrangement are preferably arranged next to one another as a pack.

In a further preferred embodiment, the pump is designed for the transporting of multiphase mixtures. The pump can preferably be used for fluid temperatures and mixture temperatures from 5 to 150° C. and for pressures from 3 to 240 bar.

The pump in accordance with the invention has the advantage that the length of the pump, and in particular of the relief piston for the axial thrust compensation, can be shortened; the clearance between the relief piston and the housing is less critical and the leakage amounts in the region of the relief piston can be reduced. Furthermore, the pump in accordance with the invention is relatively less sensitive with respect to changes in temperature and rotational speed and to vibrations and allows a simple and robust design of the dynamic shaft seals. The comparatively low service effort for the restrictor gap seals is also advantageous.

Further advantageous embodiments can be seen from the description below in conjunction with the accompanying drawings.

The invention will be explained in more detail in the following with reference to the embodiment and to the drawing.

DESCRIPTION OF THE PREFERRED EMBODIMENTS

Figure 1:
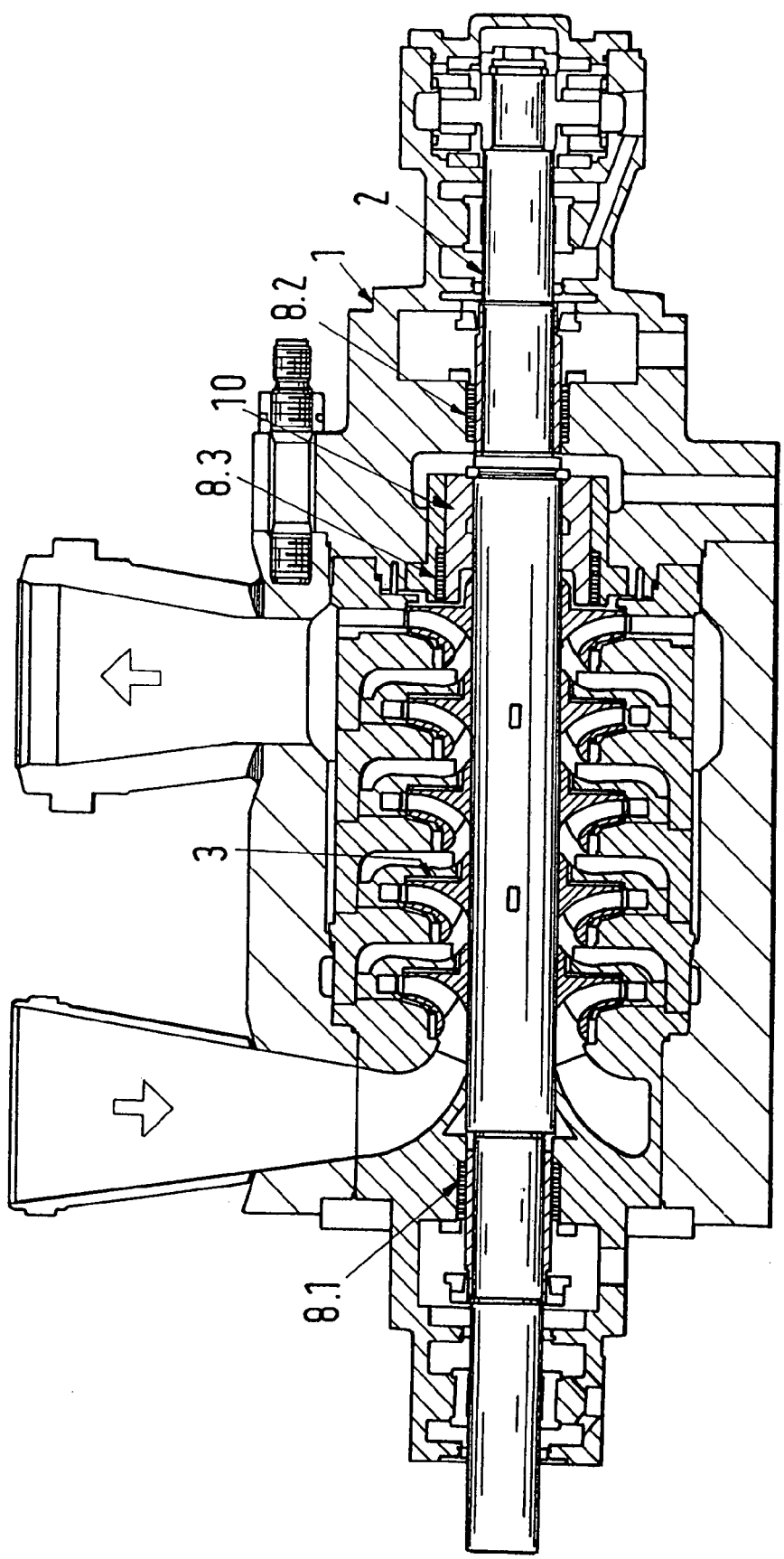
FIG. 1 is a longitudinal section through a pump in accordance with an embodiment relating to the present invention.

FIG. 1 shows a longitudinal section through a pump in accordance with an embodiment relating to the present invention. In FIG. 1, reference numeral 1 designates a housing, reference numeral 2 a shaft which is rotatably arranged in the housing 1, and reference numeral 10 a relief piston for the axial thrust compensation which is connected to the shaft 2 such that it rotates along on a rotation of the shaft. The shaft 2 is fitted with impellers 3. Since pressure compensation flows along the shaft and along the relief piston reduce the pump power and pollute the environment in dependence on the medium transported, restrictor gaps are provided between the housing and the shaft or between the housing and the relief piston respectively in order to limit the flow losses along the shaft and along the relief piston. Furthermore, restrictor gap seals are provided in the regions to reduce the pressure in the restrictor gaps along the pump shaft or along the relief piston respectively and to reduce the gap losses associated with the pressure compensation flows in this manner. In the present embodiment, the pump includes three such restrictor gap seals which are formed as brush seal arrangements 8.1-8.3.

The pump in accordance with the embodiment is designed for fluid temperatures and mixture temperatures from 5° C.-120° C., from 5° C.-150° C. or from 5° C.-200° C. and for pressure from 5-160 bar, from 3-240 bar or from 3-320 bar.

Figure 2:
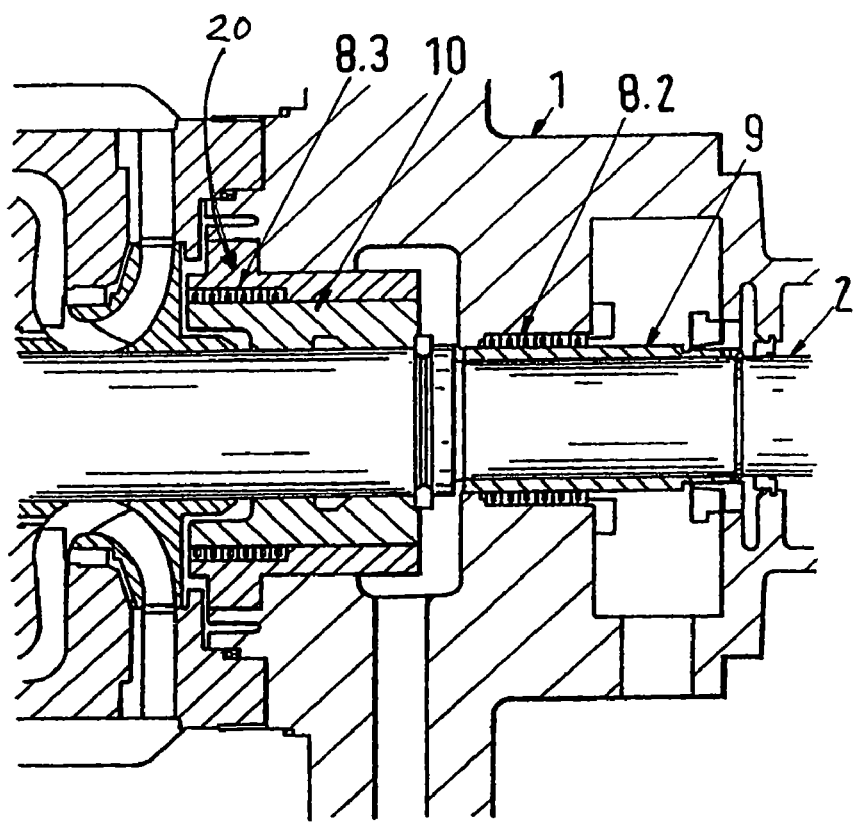
FIG. 2 is an enlarged section from the longitudinal section shown in FIG. 1.

FIG. 2 shows an enlarged section from the longitudinal section through the pump shown in FIG. 1 in accordance with the embodiment. The relief piston 10 which is connected to the shaft 2 is shown in the left-hand half of FIG. 2. The associated restrictor gap along the relief piston 10 is not especially emphasized in FIG. 2 since the gap widths used are small with respect to the pump dimensions. The restrictor gap seal 8.3 in the region of the relief piston is formed as a brush seal arrangement which contains one or more individual brush seals. The individual brush seals are rigidly arranged in an intermediate part 20 which is in turn rigidly connected to the housing 1. The intermediate part is sealed with respect to the housing 1, which is, however, not especially emphasized in FIG. 2. A second restrictor gap seal 8.2 is shown in the right-hand half of FIG. 2 and is formed as a dynamic shaft seal and seals the shaft 2 with respect to the housing 1. The second restrictor gap seal 8.2 is also formed as a brush seal arrangement which contains one or more individual brush seals which are rigidly connected to the housing 1. For the protection of the shaft 2, a shaft protection sleeve 9 is provided in the region of the second restrictor gap seal and is pulled onto the shaft. An air gap can be provided between the shaft protection sleeve 9 and the shaft 2 for the thermal insulation.

Figure 3:
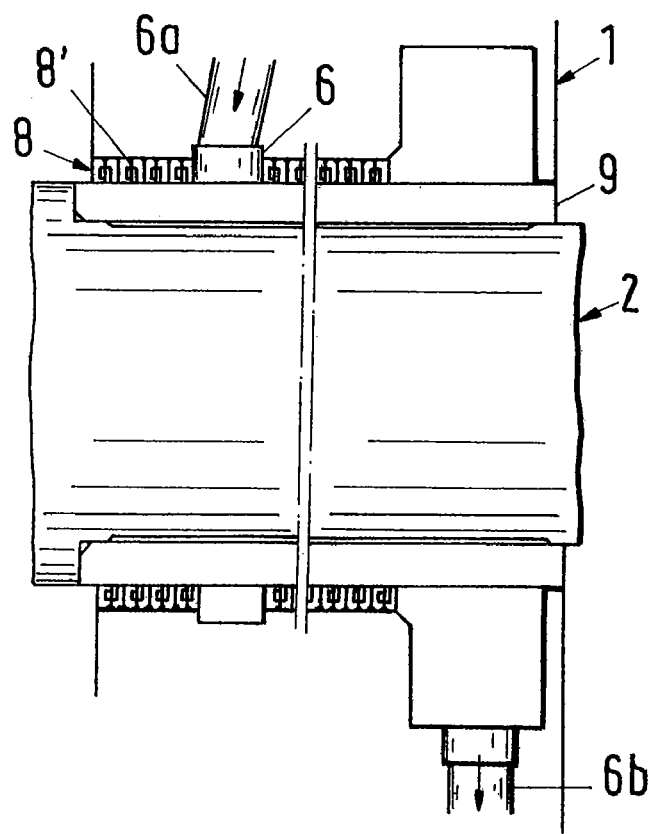
FIG. 3 is a longitudinal section of a variant of a restrictor gap seal for use in the embodiment.
Figure 5:
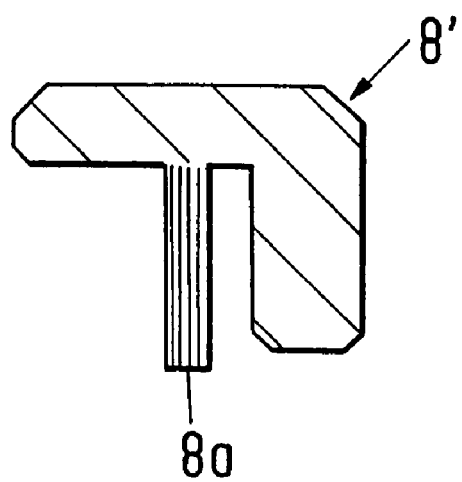
FIG. 5 is a section through a brush seal (detailed view).

FIG. 3 shows a longitudinal section of a variant of a restrictor gap seal for use in the embodiment. The same reference numerals as in FIGS. 1 and 2 are used for the designation of the individual pump parts in FIG. 3. Reference numeral 1 designates a housing and reference numeral 2 a shaft which is rotatably arranged in the housing 1. The bearings required for this are not shown in FIG. 3. A restrictor gap seal is arranged between the shaft 2 and the housing 1 and is formed as a dynamic shaft seal and seals the shaft with respect to the housing, with the dynamic shaft seal being formed as a brush seal arrangement 8 which contains a plurality of individual brush seals 8'. A detailed view of a section through an individual brush seal 8' is reproduced in FIG. 5. The brush seal 8' includes as sealing members a plurality of sealingly arranged fibers, bristles and/or wires 8a which are distributed and fastened in ring form and whose free ends extend towards the surface to be sealed. In addition to the individual brush seals 8', the brush seal arrangement 8 in the present variant includes a quench seal, i.e. a seal section 6 through which a blocking liquid or flushing liquid flows. For this purpose, the brush seal arrangement 8 is fitted with an inlet 6a and an outlet 6b for the blocking liquid and/or flushing liquid. If required, the blocking liquid and/or flushing liquid can have a lower temperature than the transported fluids or mixtures to achieve a cooling effect. A plurality of ring-shaped brush seals 8' of the brush seal arrangement 8 are advantageously arranged next to one another as a pack. Expediently, the shaft 2 is provided with a shaft protection sleeve 9 in the region of the brush sealing arrangement 8. An insulation gap can be provided between the shaft protection sleeve 9 and the shaft 2 for the thermal insulation.

Figure 4:
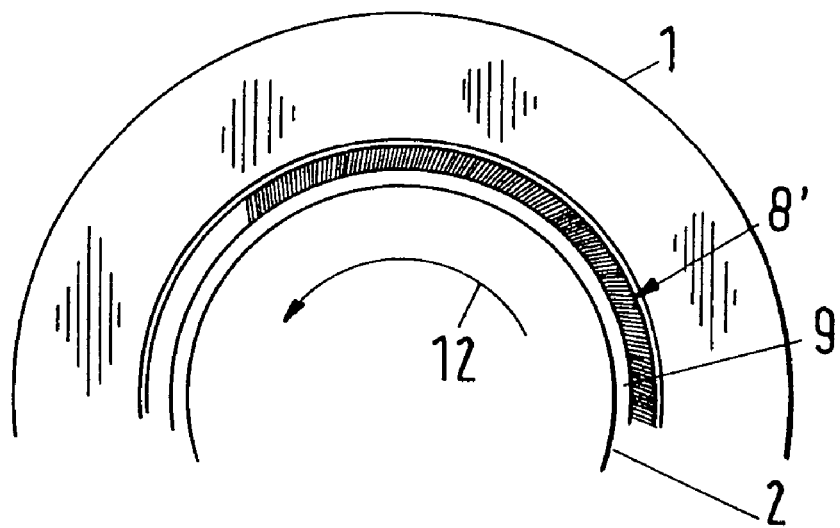
FIG. 4 is a cross-section through the restrictor gap seal shown in FIG. 3.

FIG. 4 shows a cross-section through the variant of a restrictor gap seal shown in FIG. 3, with the sectional plane being placed in one of the brush seals 8'. As can be seen from FIG. 4, a shaft protection sleeve 9 is provided on the shaft 2. The brush seal 8', which is fitted into the housing 1, surrounds the shaft protection sleeve 9 such that the shaft 2 is sealed in the axial direction. For this purpose, the brush seal 8' includes a plurality of sealingly arranged fibers, bristles and/or wires which are distributed and fastened in ring form and whose free ends extend towards the surface to be sealed, i.e. in the present variant towards the surface of the shaft protection sleeve 9. The section in FIG. 4 has been placed such that the fibers, bristles and/or wires of the brush seal 8' are visible. Expediently, the fibers, bristles and/or wires of the brush seal are flexible and/or are flexibly fastened and are arranged at an acute angle to the surface to be sealed, with the tip of the angle extending in the running direction 12 of the shaft 2. Advantageously, the length of the fibers, bristles and/or wires is selected such that they are ground to the suitable length by the rotating shaft protection sleeve 9.

The invention claimed is:

1. A pump for the transporting of fluids and/or of mixtures of fluids with a proportion of solid material and for a pressure ranging from 3 to 320 bar comprising a housing (1), a shaft (2) and at least one restrictor gap seal which is provided in the housing (1) to seal the shaft with respect to the housing, wherein the restrictor gap seal is formed as a brush seal arrangement (8.1-8.3) which contains one or more individual brush seals (8') which include as sealing members a plurality of sealingly arranged sealing members selected from the group consisting of, bristles, wires, and combinations thereof (8a) which are distributed and fastened in ring form, wherein the sealing members extend towards at least one of the shaft and a shaft protection sleeve fitted to the shaft and to an axial stop on the shaft.

2. A pump in accordance claim 1, wherein the sealing members of the brush seal (8') are flexible.

3. A pump in accordance with claim 1, wherein the length of the sealing members of the brush seal (8') is predetermined such that they can be ground to a suitable length by the rotatable part (2, 10).

4. A pump in accordance with claim 1, wherein the brush seal arrangement (8) includes a section (6) through which flows a fluid selected from the group consisting of a blocking fluid, a flushing fluid, and combinations thereof.

5. A pump in accordance with claim 4, wherein the fluid has a lower temperature than the transported fluids and/or mixtures of fluids with a proportion of solid material in order to achieve a cooling effect.

6. A pump in accordance with claim 1, wherein a plurality of brush seals (8') of the brush seal arrangement (8) are arranged next to one another as a pack.

7. A pump in accordance with claim 1, wherein the pump is designed for the transporting of multiphase mixtures.

8. A pump in accordance claim 1, wherein the sealing members of the brush seal (8') are fastened flexibly.

9. A pump in accordance claim 1, wherein the sealing members of the brush seal (8') are arranged at an acute angle to the surface of the rotatable part (2, 10) and the tip of the angle extends in the running direction (12) of the rotatable part.

10. A pump for the transporting of fluids and/or of mixtures of fluids with a proportion of solid material comprising a housing (1) a rotatable relief piston (10) for axial thrust compensation, and at least one restrictor gap seal provided in the housing (1) to seal the balancing piston with respect to the housing, and wherein the restrictor gap seal is formed as a brush seal arrangement (8, 8.1-8.3) which contains one or more individual brush seals (8') including as sealing members a plurality of sealingly arranged sealing members selected from the group consisting of bristles, wires (8a), and combinations thereof, which are distributed and fastened in ring form and whose free ends extend towards the surface to be sealed.

* * * * *